United States Patent [19]

Hammerstrom

[11] Patent Number: 5,175,858
[45] Date of Patent: Dec. 29, 1992

[54] MECHANISM PROVIDING CONCURRENT COMPUTATIONAL/COMMUNICATIONS IN SIMD ARCHITECTURE

[75] Inventor: Daniel W. Hammerstrom, Aloha, Oreg.

[73] Assignee: Adaptive Solutions, Inc., Beaverton, Oreg.

[21] Appl. No.: 664,087

[22] Filed: Mar. 4, 1991

[51] Int. Cl.⁵ .............................................. G06F 15/76
[52] U.S. Cl. ...................................... 395/800; 395/375
[58] Field of Search ............... 395/725, 800, 425, 375; 364/DIG. 1, DIG. 2

[56] References Cited

U.S. PATENT DOCUMENTS

| | | |
|---|---|---|
| 4,380,046 | 4/1983 | Fung . |
| 4,384,273 | 5/1983 | Ackland et al. . |
| 4,412,303 | 10/1983 | Barnes et al. . |
| 4,481,580 | 11/1984 | Martin et al. .................. 395/325 |
| 4,498,134 | 2/1985 | Hansen et al. . |
| 4,574,394 | 3/1986 | Holsztynski et al. . |
| 4,580,215 | 4/1986 | Morton . |
| 4,591,981 | 5/1986 | Kassabov . |
| 4,592,933 | 2/1991 | Taylor et al. .................. 395/800 |
| 4,593,351 | 6/1986 | Hong et al. .................... 395/800 |
| 4,621,339 | 11/1986 | Wagner et al. . |
| 4,720,780 | 1/1988 | Dolecek . |
| 4,773,038 | 9/1988 | Hillis et al. .................... 364/200 |
| 4,792,894 | 12/1988 | Artz et al. . |
| 4,823,281 | 4/1989 | Evangelista et al. ........... 395/135 |
| 4,852,048 | 7/1989 | Morton . |
| 4,855,903 | 8/1989 | Carleton et al. ............... 395/325 |
| 4,873,626 | 10/1989 | Gifford . |
| 4,945,479 | 7/1990 | Rusterholz et al. ........... 395/800 |
| 5,072,371 | 12/1991 | Benner et al. ................. 395/200 |

*Primary Examiner*—Robert L. Richardson
*Attorney, Agent, or Firm*—Kolisch, Hartwell, Dickinson, McCormack & Heuser

[57] ABSTRACT

A concurrent computation/communication architecture is intended for use in a single instruction stream, multiple data stream (SIMD) processor node which includes an input bus (20), an input unit (54), manipulation units (58, 60, 62, 64, 66) and an output bus (22). Processor nodes (12, 14, 16, 18) include an output unit (68) which receives data from the input unit (54) and the various manipulation units. Processor nodes (12, 14, 16, 18) store and transmit data from the output unit (68) at a selected time over the output bus (22). A processor node control unit (56) is provided for controlling the exchange of data between the processor nodes (12, 14, 16, 18), their associated output buffers (38, 40, 42, 44) and the output bus (22).

10 Claims, 2 Drawing Sheets

MECHANISM PROVIDING CONCURRENT COMPUTATIONAL/COMMUNICATIONS IN SIMD ARCHITECTURE

TECHNICAL FIELD

The instant invention relates to a computer processor architecture, and specifically to an architecture which provides concurrent computational/communications actions in a SIMD architecture. The architecture includes an output processor node which allows simultaneous data processing and communications in a single processor node.

BACKGROUND ART

Neural networks are a form of architecture which enables a computer to closely approximate human thought processes. One form of neural network architecture enables single instruction stream, multiple data stream (SIMD) operations which allow a single command to direct a number of processors, and hence data sets, simultaneously.

There are several important practical problems that cannot be solved using existing, conventional algorithms executed by traditional, conventional computers. These problems are often incompletely specified and are characterized by many weak constraints requiring large search spaces.

The processing of primary cognitive information by computers, such as computer speech recognition, computer vision, and robotic control, fall into this category. Traditional computational models bog down to the point of failure under the computational load if they are tasked to solve these types of problems. Yet animals perform these tasks using neurons that are millions of times slower than transistors. A neuron performs a weighted sum of inputs, which may be described as $\Sigma W_{ij} O_i$, where $W_{ij}$ is a value drawn from "memory" and $o_i$ is an input value. A SIMD multiply/accumulate function performs this operation.

Feldman's 100-step rule, which is an argument for massively parallel computing, states that a "human" cognitive process having a time of 500 msec. can be accomplished in 5 msec neuron switching time. If the "switching" time is slow, a fast system may nevertheless be constructed with a large number of "switches". This implies that there are two vastly different computational models at work. It also suggests that in order to build computers that will do what nervous systems do, the computers should be structured to emulate animal nervous systems. A SIMD system is a computing system which is designed to emulate a massively parallel neural network.

A nervous system, and a neurocomputational computer, is characterized by continuous, non-symbolic, and massively parallel structure that is fault-tolerant of input noise and hardware failure. Representations, i.e., the input, is distributed among groups of computing elements, which independently reach a result or conclusion, and which then generalize and interpolate information to reach a final output conclusion.

Put another way, connectionist/neural networks search for "good" solutions using massively parallel computations of many small computing elements. The model is one of parallel hypothesis generation and relaxation to the dominant, or "most-likely" hypothesis. The search speed is more or less independent of the size of the search space. Learning is a process of incrementally changing the connection (synaptic) strengths, as opposed to allocating data structures. "Programming" in such a neural network is by example.

In the case where total, or near total, connectivity (30% or higher) of communication node units is constructed, a great deal of time is spent waiting for the individual processors to communicate with one another after the data set has been acted upon. Known processing units do not provide a mechanism for allowing computation to occur on a subsequent data set until all processor nodes have transmitted their previously acted upon data.

DISCLOSURE OF THE INVENTION

An object of the invention is to provide a concurrent use architecture which will provide concurrent computational and communications functions in a SIMD structure.

Another object of the invention is to provide a output processor architecture which retains processed data while like output processors are communicating processed data on a transmission network.

A further object of the invention is to provide an output processor which stores processed data while the processor acts upon a subsequent data set.

Still another object of the invention is to provide a mechanism in a output processor for arbitrating communication protocol on a communications network.

The concurrent use architecture of the invention is intended for use in a single instruction stream, multiple data stream processor node which includes an input bus, an input unit, manipulation units and an output bus. The architecture includes an output processor having an output buffer unit which receives data from the input unit and various manipulation units. The processor node stores and transmits data from the output buffer unit at a selected time over the output bus. A control unit is provided for directing the SIMD computation and controlling the exchange of data between the processor node, and an associated output processor node and the output buffer unit. The output processor has an internal controller to direct storage and transmission of data on the output bus.

These and other objects and advantages of the invention will become more fully apparent as the description which follows is read in conjunction with the drawings.

BEST MODE FOR CARRYING OUT THE INVENTION

Figure 1:
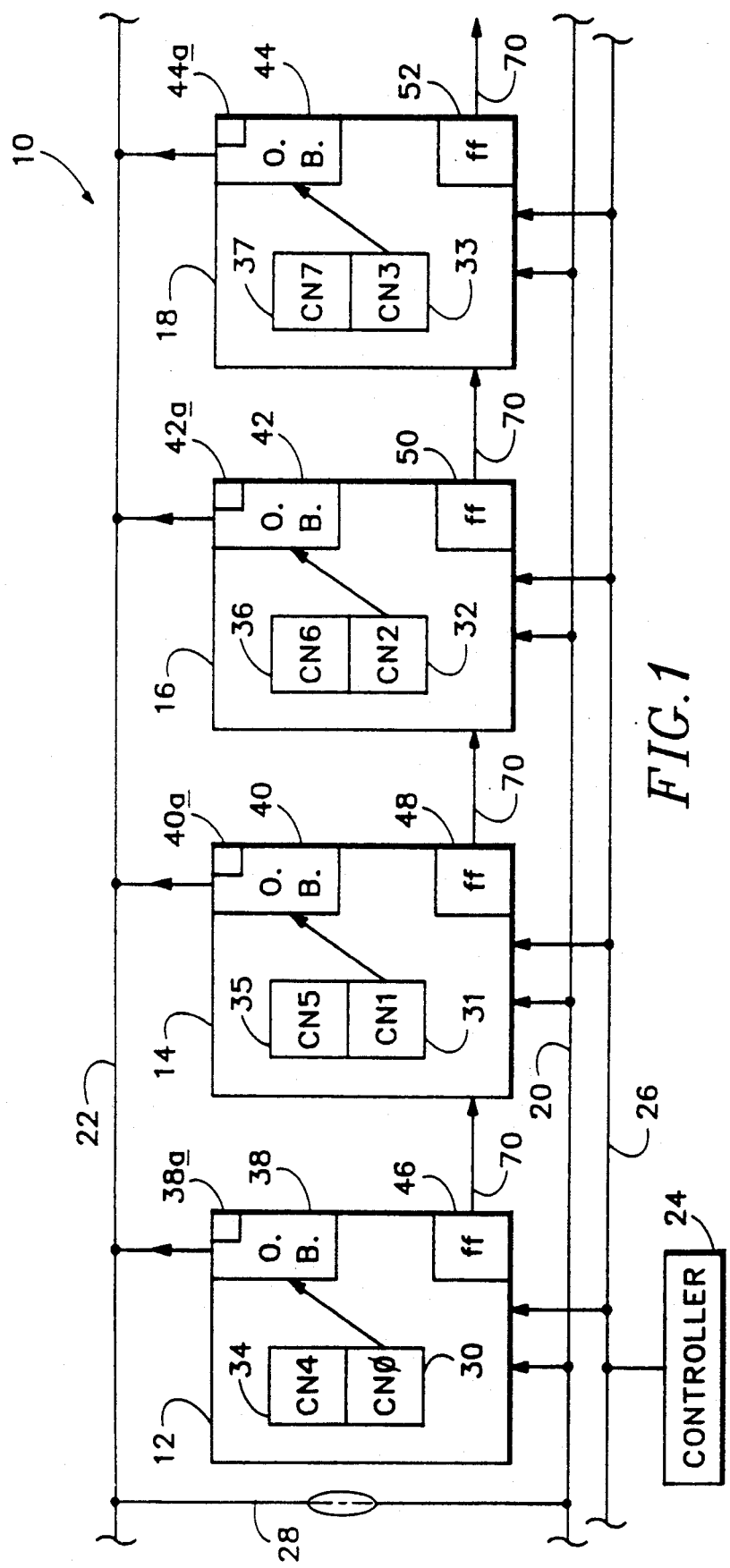
FIG. 1 is a schematic representation of an array of processor nodes constructed according to the invention.

Turning now to the drawings, and initially to FIG. 1, an array of single instruction stream, multiple data stream (SIMD) processor nodes are shown generally at 10. Array 10 includes processor nodes 12, 14, 16 and 18, and may contain as many more processor nodes as are desired for a particular application. FIG. 1 contains only four such processor nodes for the sake of brevity and to allow an explanation of the interaction between multiple processor nodes. Each processor node is connected to an input bus 20 and an output bus 22. Buses 20 and 22 are depicted as being single entity structures in FIG. 1, however, in some circumstances, both the input and/or output bus may be multiple bus structures.

A single controller 24 is connected to a control bus 26, which in turn is connected to each of the processor nodes. In some instances, output bus 22 may be connected directly to input bus 20 by means of a connection 28, or, output bus 22 may be connected to the input bus of another array of processor nodes, while the output bus of another array of processor nodes may be connected to input bus 20.

As depicted in FIG. 1, each processor node (PN) includes a pair, or more, of communication nodes, such as the connection node (CN) depicted at 30-37 in processor nodes 12-18. A CN is a state associated with an emulated node in a neural network located in a PN. Each PN may have several CNs located therein. Following conventional computer architecture nomenclature, processor node 12 contains the state information for connection node $\emptyset$ (CN$\emptyset$) and the state information for connection node 4 (CN4), processor node 14 contains the state information for connection node 1 (CN1) and the state information for connection node 5 (CN5), processor node 16 contains the state information for connection node 2 (CN2) and the state information for connection node 6 (CN6), and processor node 18 contains the state information for connection node 3 (CN3) and the state information for connection node 7 (CN7).

Figure 2:
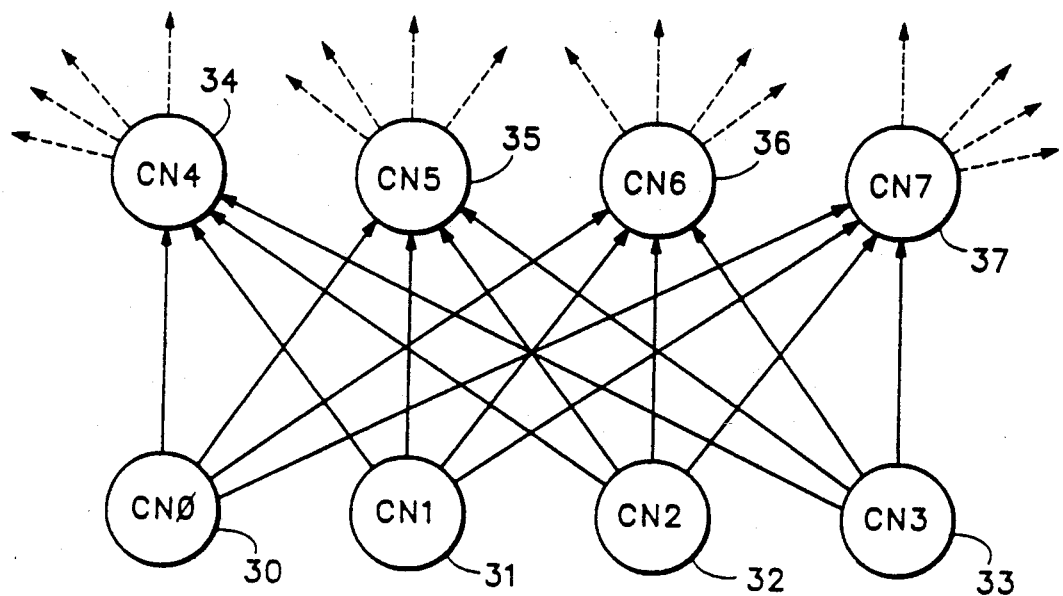
FIG. 2 is a schematic diagram of a broadcast communication pattern of communication nodes contained within the processor nodes of FIG. 1.

Referring momentarily to FIG. 2, the broadcast patterns that are set up between connection nodes $\emptyset$-7 are depicted. The CNs are arranged in "layers", with CN$\emptyset$-CN3 comprising one layer, while CN4-CN7 comprise a second layer. As previously noted, there may be more than two layers of connection nodes in any one processor node or in any array of processor nodes. The connection nodes operate in what is referred to as a broadcast hierarchy, wherein each of connection nodes $\emptyset$-3 broadcast to each of connection nodes 4-7. An illustrative technique for arranging such a broadcast hierarchy is disclosed in U.S. Pat. No. 4,796,199, NEURAL-MODEL INFORMATION-HANDLING ARCHITECTURE AND METHOD, to Hammerstrom et al, Jan. 3, 1989, which is incorporated herein by reference.

Conceptually, the available processor nodes may be thought of as a "layer" of processors, each executing its function (multiply, accumulate, and increment weight index) for each input, on each clock, wherein one processor node broadcasts its output to all other processor nodes. By using the output processor node arrangement, it is possible to provide $n^2$ connections in n clocks using only a two layer arrangement. Known, conventional SIMD structures may accomplish $n^2$ connections in n clocks, but require a three layer configuration, or 50% more structure.

A normal sequence of events in the SIMD array depicted at 10 begins with a specific piece of data being transmitted to each processor node. The data is acted upon by an instruction which is transmitted over input bus 20. Each processor node performs whatever operation is required on the data, and then attempts to transmit the information on output bus 22. Obviously, not every processor node can transmit on the output bus simultaneously, and under normal conditions, the processor nodes have to wait for a number of clocks, or cycles, until each processor node in the array has transmitted its information on the output bus.

During this wait time, the processor node is essentially operating at idle, as it cannot perform any additional functions until it has transmitted. To resolve this problem, output processors, or output buffers, such as those depicted at 38, 40, 42 and 44 are included in the architecture of each processor node. The output buffers receive the information from an associated connection node and hold the information or data until such time as each processor node receives clearance to transmit on output bus 22. Because the data is held in the output buffer, the remainder of the processor node can perform other functions while the output processor node is waiting to transmit.

In order to control arbitration between the various processor nodes, so that the nodes will transmit on output bus 22 at the proper time, each processor node contains a flip flop, such as flip flops 46, 48, 50 and 52. Flip flops are also referred to herein as arbitration signal generators.

Figure 3:
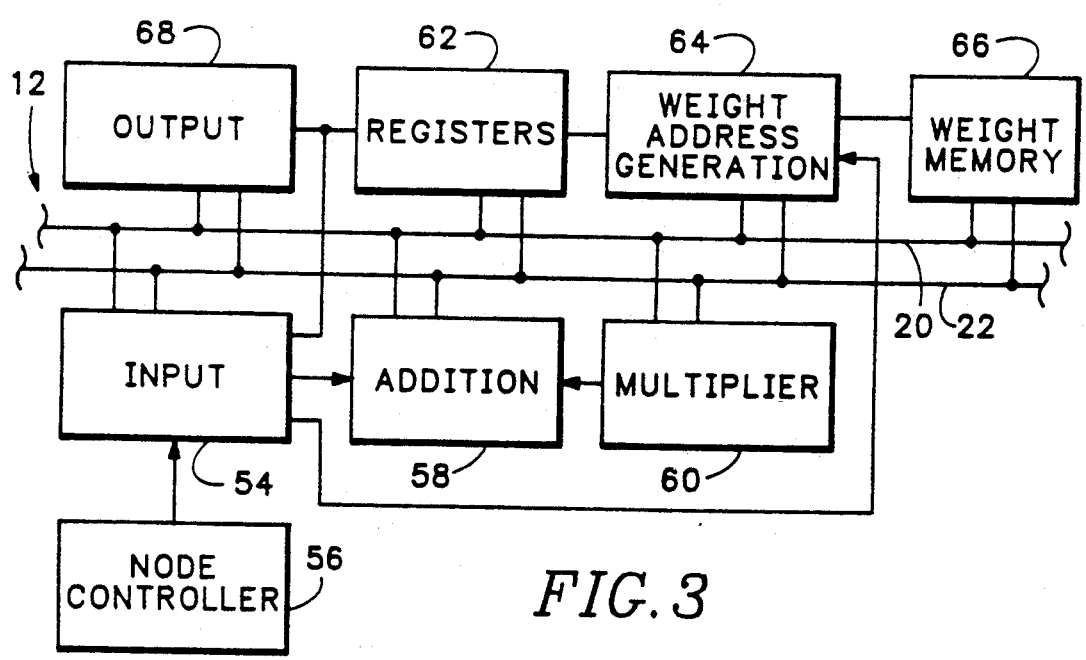
FIG. 3 is a block diagram of a single processor node of the invention.

Referring now to FIG. 3, the remaining components of a single processor node, such as processor node 12, are depicted in greater detail. Node 12 includes an input unit 54 which is connected to input bus 20 and output bus 30. Again, only single input and output buses are depicted for the sake of simplicity. Where multiple input and/or output buses are provided, input unit 54, and the other units which will be described herein, have connections to each input and output bus. A processor node controller 56 is provided to establish operational parameters for each processor node. An addition unit 58 provides addition operations and receives input from input unit 54, a multiplier 60, and is connected to the input and output buses.

A register unit 62 contains an array of registers, which in the preferred embodiment of the architecture includes an array of 32 16-bit registers. A number of other arrangements may be utilized. A weight address generation unit 64 computes the next address for a weight memory unit 66. In the preferred embodiment, the memory address may be set in one of two ways: (1) by a direct write to a weight address register, or (2) by asserting a command which causes the contents of a weight offset register to be added to the current contents of the memory address register, thereby producing a new address. Node controller 56, addition unit 58, multiplier unit 60 register unit 62 and weight address generation unit 64 comprise what is referred to herein as a manipulation unit.

An output unit 68 is provided to store data prior to the data of being transmitted on output bus 22. Output unit 68 includes output processor node, 38, which receives data from the remainder of the output unit prior to the data being transmitted. Data is transmitted to output bus 22 by means of one or more connection nodes, such as connection node 30 or 34, which are part of the output unit. Output unit 68 includes an output buffer register which initially receives processed data. Once this data is loaded into the register, the output buffer unit becomes "armed". Once armed, the output buffer operates independently, but synchronously, from the rest of the processing node.

An arbitration process is provided between the output buffers of the different processor nodes in order to determine which output buffer, or output processor node, will transmit first over output bus 22, since only one PN can use the output bus at any one time. Once the processor node has transmitted, a hand shake arrangement, extending from a flip flop, such as flip flop 46 in processor node 12, and indicated by arrow 70, signals the next processor node to transmit. Although the arrangement in FIG. 1 indicates that the transmission occurs from immediately adjacent nodes, this is not necessarily representative of what may happen in the actual processor node array. It may be that some other order of transmission is determined by the arbitration process.

Arbitration and transmission occur only when a transmit signal is asserted by controller 24 to allow synchronization of the transmission with other operations being conducted in the array. Several modes of arbitration/data transfer are provided in the architecture: sequential, global and direct. The arbitration mode is selected by controller 24. Controller 24 and flip flops 46, 48, 50 and 52 comprise what is referred to herein as arbitration means, which is operable to determine at which point in processor operation a signal will be transmitted from a output processor node.

Sequential mode, as the term indicates, requires a control signal over control bus 26 to travel from one processor node to the next.

Global arbitration uses a signal that travels on the control bus which enables transmission from all processor nodes, but which operates the processor nodes in a daisy-chain, allowing certain processor nodes to transmit while others may pass, i.e., thereby not transmitting any data for a particular cycle, or clock.

Direct arbitration is used in a situation where data is written directly into the output buffer and immediately transmitted over the output bus on the next transmit cycle.

In a SIMD structure, a single instruction passes over control bus 26 to all of the processor nodes. The instruction is carried out, simultaneously, on the values which are present in the individual processor nodes, which have been input over input bus 20. Each output buffer has its own internal controller, depicted in FIG. 1 at 38a, 40a, 42a and 44a, which is described in the code and structure which follow herein, which is how each output processor operates separately from SIMD control 24.

In conventional architectures, the output is transmitted over output bus 22 in a predetermined sequencing of transmissions from the individual processor nodes. This of course, requires that the processor node wait until the other processor nodes in the array are finished transmitting before a new instruction set or new data can be received in the processor node. The provision of output buffers in each PN provides a location where the process data may be stored while the processor node waits its turn at the output bus. Additional operations may be occurring in the processor nodes, which may have new data loaded, or which may have existing data acted upon by a new instruction set.

Connection 28 may be enabled if it is desired that the output data from a processor node become the input data for a processor node, or other processor nodes. Such enablement is accomplished by conventional micro-circuitry mechanisms, and is depicted schematically in FIG. 2.

The actual operation of an individual processor in array 10 may be described by the following instruction set, which, while presented in software form, would be incorporated into the physical design of the integrated circuit containing the output processor nodes of the invention.

The following code is a simplification of the code that describes the actual CMOS implementation of the PN structure in a neurocomputer chip. The code shown below is in the C programming language embellished by certain predefined macros. The code is used as a register transfer level description language in the actual implementation of the circuitry described here. Bolded text indicates a signal, hardware or firmware component, or a phase or clock cycle.

The ph1 and ph2 variables simulate the two phases in the two-phase, non-overlapping clock used to implement dynamic MOS devices.

The post-fix "_D" associated with some signal names, means a delayed version of the signal, "_B" means a bus (more than one signal line), "_1" means a dynamic signal that is only valid during ph1. These can be combined arbitrarily.

Output unit (obUNIT) 68 contains the output buffer. The PN Output Buffer Interface is used for output and allows the output to run independently from the input, and is used during various recursive and feedback operations.

```
if (reset) { outst=0; seqrght=0;
    obarmd=0; seqgo_1D=0
```

This step initialize variables which are used during the processing. During output buffer arbitration for the output bus, the arbitration signal from a PN's left most neighbor will set the sequential arbitration ok signal, seqgo_1D.

```
if (ph1) seqgo_1D=leftff;
``` leftff is the signal from flip flop 46, also referred to herein as arbitration signal generator means, in PN 12, on the left and indicates that PN 12 has transmitted and it is now PN 14's turn.

When the output buffer is written, the obarmd flip flop 46 is set. obarmd indicates that the output buffer is armed and ready to transmit. This transmission operates independently of the remaining computation inside the PN and forms the essence of the output buffer architecture of the invention.

If transmission is in two bytes, the low byte is sent first. This occurs if the transmit control is asserted and if the PN's output buffer is armed. The outst flip flop is used to indicate that this is the second of a two byte transmission. All of the arbitration decisions discussed at this point operate in the sequential mode, where a PN signals its neighbor to the right when it has completed its transmission. xmit is the SIMD command that tells the output buffer of a particular PN to transmit (if it has received an arbitration signal). The seqarb flip flop indicates that this arbitration mode is enabled. outmd2 indicates that this is a two byte transmission:

```
if ((ph1) ANDb ((obarmd) ANDb (xmit)) {
    if (seqarb) {
        if (outst==1) {      outbus_B2 = (outbuf_B
        AND 0xFF00L)>> 8;
        outst=0;  obarmd=0;  seqrght=1;
```

The previous sequence executes the outbuf state machine for sequential arbitration. seqrght signals the next PN to transmit on the next clock

```
        else if (seqgo_1D) {
            if (outmd2) {
                if (outst==0)  { outbus_B2 = outbuf_B AND
0xFFL;
                outst=1; }
            }
            else {      outbus_B2 = outbuf_B AND 0xFFL;
                    obarmd=0; seqrght=1; }
        }
    }
}
```

After all of the PNs have transmitted over output bus 22, the arbitration protocol is reset and the system is queried to determine if there is more output to follow:

```
if (reset)obarmd=0;
if ((ph2)ANDb(vcval)ANDb(rgctl_B2==F_RGABUS)ANDb
    r_B==F_OUTBUF) ) {
    obarmd=1;}
if ((ph2)ANDb(vcval)ANDb(rgctl_B2==F_RGBBUS)ANDb
    r_B==F_OUTBUF) ) {
    obarmd=1;}
```

If an output buffer contains information to be transmitted. obarmd is set and the cycle repeats. vcval indicates a valid output buffer control signal, rgctl_B2 indicates that a write to the output buffer is now occurring, and r_B indicates the output buffer, F_OUTBUF. is being addressed. Writing to the register OUTBUF sets obarmd. which turns on (enables) the PN output buffer.

Operation of the architecture of array 10 may be summarized as follows:

During Clock Zero:

Initially, CN0. CN1. CN2 and CN3 have values which are located in register 62 of processor nodes 12, 14, 16 and 18, respectively. The values are written to the respective output buffer in each PN over an appropriate connection.

During Clock One:

Output buffer 38 in processor node 12 transmits the output of CN0 onto output bus 22. This value is read by processor nodes 12, 14, 16 and 18 over connection 28 and input bus 20. Each processor node fetches a weight from weight memory 66 and multiplies, for instance, the output of CN0 times the various weights, such as w40, w50, w60 and w70. Output buffer 38 and processor node 12 then transmit an arbitration signal, through flip flop 47 and connection 70, to output buffer 40 in processor node 14, the next-in-time processor node, that it may now transmit on output bus 22.

During Clock Two:

Output buffer 40 in processor node 14 transmits the output of CN1 onto output bus 22. This value is read by processor nodes 12, 14, 16 and 18 over connection 28 and input bus 20. Each processor node fetches a weight from weight memory 66 and multiplies, for instance, the output of CN0 times the various weights, such as w41, w51, w61 and w71. Output buffer 40 and processor node 14 then signal, by flip flop 48 and connection 70, output buffer 42 in processor node 16 that it may now transmit.

Similar action occurs during successive clock cycles until the data has been processed.

Another way of looking at the processor node function is to consider that each processor node has a multiplier 60, an adder 58 and two look tables, weight address generation 64 and weight memory 66. Each node receives an input and does a multiply-accumulate on each clock. After the accumulation loop, each processor node moves its output into its output buffer and waits for its turn to broadcast. The steps may be represented as $$O_i = f\left(\sum_{i=1}^{n} W_{ij}O_j\right)$$

The output, $O_i$ is therefore equal to the summation of the values drawn from weight memory 66, $W_{ij}$, times the input value, $O_j$, wherein the entire function is stored in the weight address generator 64.

Although a preferred embodiment of the invention has been disclosed herein, it should be appreciated that variations and modifications may be made thereto without departing from the scope of the invention as defined in the appended claims.

INDUSTRIAL APPLICATION

Processors constructed according to the invention are useful in neural network systems which may be used to simulate human brain functions in analysis and decision making applications.

What I claim is:

1. In a single instruction stream, multiple data stream (SIMD) system having a SIMD processor node (12, 14, 16, 18), an input bus (20), an input unit (54), manipulation units (56–66) and an output bus (22), a output processor architecture located on the SIMD processor node comprising:
    an output unit (68) which receives data from the input unit (54) and manipulation units (56–66);
    an output buffer (38) located on the SIMD processor node (12) for storing data and transmitting the data from the output unit (68) at a selected time; and
    a control unit (56) for controlling the exchange of data between the SIMD processor node (12), an associated output buffer (38) and the output unit (68).

2. The architecture of claim 1 which further includes arbitration means (46) for determining at what point in SIMD processor node operation a signal will be transmitted from an output buffer (38).

3. The architecture of claim 2 wherein said arbitration means includes an arbitration signal generator (46) located in each SIMD processor node (12) for generating a control signal to the next sequentially operable SIMD processor node (14) for controlling operation of said next SIMD processor node.

4. The architecture of claim 1 wherein each output buffer includes a discrete, internal controller (38a) for controlling the sequencing of data storage and subsequent transmission to the output bus (22).

5. The architecture of claim 1 which includes plural connection nodes (30, 34) located within each SIMD processor node, said connection nodes being constructed and arranged to provide $n^2$ connections in n clocks.

6. The architecture of claim 5 wherein, during each clock, selected connection nodes (30) broadcast, through their associated SIMD processor nodes, to all of a selected set of connection nodes (34, 35, 36, 37).

7. In a single instruction stream, multiple data stream (SIMD) system having SIMD processor nodes (12, 14, 16, 18), an input bus (20) connected to all of the SIMD processor nodes for providing a data stream thereto, an input unit (54), manipulation units (58-66) and an output bus (22) connected to all of the SIMD processor nodes for receiving a data stream therefrom, an output processor architecture located on each SIMD processor node comprising, for each SIMD processor node:
- an output unit (68) which receives data from the input unit (54) and manipulation units (58-66);
- an output buffer (38) located on each SIMD processor node (12) for storing data and transmitting the data from the output unit (68) at a selected time;
- a control unit (56) for controlling the exchange of data between the SIMD processor node (12), an associated output buffer (38) and the output unit (68); and
- an arbitration signal generator (46) located in each SIMD processor node (12) for generating a signal to the next-in-time SIMD processor node (14) instructing the next-in-time SIMD processor node to transmit.

8. The architecture of claim 7 wherein each output buffer (38) includes a discrete, internal controller (38a) for controlling the sequencing of data storage and subsequent transmission to the output bus (22).

9. The architecture of claim 7 which includes plural connection nodes (30, 34) located within each SIMD processor node (12), said connection nodes being constructed and arranged to provide $n^2$ connections in n clocks.

10. The architecture of claim 9 wherein, during each clock, selected connection nodes (30) broadcast, through their associated SIMD processor nodes, to all of a selected set of connection nodes (34, 25, 26, 37).

* * * * *